United States Patent
Xu et al.

(10) Patent No.: US 11,333,796 B2
(45) Date of Patent: May 17, 2022

(54) SPATIAL AUTOCORRELATION MACHINE LEARNING-BASED DOWNSCALING METHOD AND SYSTEM OF SATELLITE PRECIPITATION DATA

(71) Applicants: Guangzhou Institute of Geography, Guangdong Academy of Sciences, Guangzhou (CN); Guangdong Meteorological Observation Data Center, Guangzhou (CN)

(72) Inventors: Jianhui Xu, Guangzhou (CN); Huihua Ruan, Guangzhou (CN); Ji Yang, Guangzhou (CN); Hongda Hu, Guangzhou (CN); Kaiwen Zhong, Guangzhou (CN); Chenghu Zhou, Guangzhou (CN)

(73) Assignees: GUANGZHOU INSTITUTE OF GEOGRAPHY, GUANGDONG ACADEMY OF SCIENCES, Guangzhou (CN); GUANGDONG METEOROLOGICAL OBSERVATION DATA CENTER, Guangzhou (CN)

( * ) Notice: Subject to any disclaimer, the term of this patent is extended or adjusted under 35 U.S.C. 154(b) by 0 days.

(21) Appl. No.: 17/259,629

(22) PCT Filed: Aug. 6, 2020

(86) PCT No.: PCT/CN2020/107509
§ 371 (c)(1),
(2) Date: Jan. 12, 2021

(87) PCT Pub. No.: WO2021/073210
PCT Pub. Date: Apr. 22, 2021

(65) Prior Publication Data
US 2022/0043182 A1 Feb. 10, 2022

(30) Foreign Application Priority Data

Oct. 14, 2019 (CN) .......................... 201910971041.8

(51) Int. Cl.
*G01W 1/14* (2006.01)
*G06N 20/00* (2019.01)
(Continued)

(52) U.S. Cl.
CPC ................ *G01W 1/14* (2013.01); *G01W 1/10* (2013.01); *G06F 17/18* (2013.01); *G06N 7/00* (2013.01); *G06N 20/00* (2019.01); *G06T 3/4007* (2013.01)

(58) Field of Classification Search
None
See application file for complete search history.

(56) References Cited

U.S. PATENT DOCUMENTS

| | | | | |
|---|---|---|---|---|
| 6,675,099 B2 * | 1/2004 | Katsuhiro | ............. | G01S 13/951 702/3 |
| 8,655,595 B1 * | 2/2014 | Green | ................... | G06Q 50/16 702/5 |

FOREIGN PATENT DOCUMENTS

| | | |
|---|---|---|
| CN | 106021872 A | 10/2016 |
| CN | 109472393 A | 3/2019 |
| CN | 110738252 A | 1/2020 |

OTHER PUBLICATIONS

Yong, Zhao, "Research on spatial distribution model of precipitation in Fujian area based on GIS technology", crystal basic science collection of China excellent master's dissertation full text database, issue 12, p. a008-51; Dec. 15, 2008; 17 pgs.
(Continued)

*Primary Examiner* — Roy Y Yi
(74) *Attorney, Agent, or Firm* — Hauptman Ham, LLP

(57) ABSTRACT

A spatial autocorrelation machine learning-based downscaling method of satellite precipitation data includes obtaining
(Continued)

the TRMM precipitation data and the land surface parameters; preprocessing the land surface parameters to obtain DEM, day land surface temperature, night surface land temperature, day-and-night land surface temperature difference and NDVI with spatial resolutions of 1 km and 25 km; performing a spatial autocorrelation analysis of the TRMM precipitation data to obtain an estimated spatial autocorrelation value of the precipitation data with a spatial resolution of 25 km; downscaling the spatial resolution of the spatial autocorrelation value of the precipitation data from 25 km to 1 km; establishing a nonlinear regression model; obtaining a precipitation downscaling data with a spatial resolution of 1 km based on the nonlinear regression model. A system and a terminal are also provided.

10 Claims, 2 Drawing Sheets

(51) Int. Cl.
*G01W 1/10* (2006.01)
*G06F 17/18* (2006.01)
*G06N 7/00* (2006.01)
*G06T 3/40* (2006.01)

(56) References Cited

OTHER PUBLICATIONS

International Search Report issued in corresponding International Application No. PCT/CN2020/107509; dated Nov. 11, 2020, State Intellectual Property Office of the P.R. China, Beijing, China, 7 pgs.
Written Opinion issued in corresponding International Application No. No. PCT/CN2020/107509; dated Nov. 11, 2020; State Intellectual Property Office of the P.R. China, Beijing, China, 10 pgs.
Notice to Grant issued in corresponding Chinese Application No. 201910971041.8; dated Jul. 10, 2020; 5 pgs.
Office Action issued in corresponding Chinese Application No. 201910971041.8; dated May 28, 2020; 17 pgs.
Search Report issued in corresponding Chinese Application No. 201910971041.8; dated May 21, 2020; 5 pgs.

* cited by examiner

SPATIAL AUTOCORRELATION MACHINE LEARNING-BASED DOWNSCALING METHOD AND SYSTEM OF SATELLITE PRECIPITATION DATA

RELATED APPLICATIONS

The present application is a National Phase of International Application Number PCT/CN2020/107509 filed Aug. 6, 2020 and claims priority of the Chinese Patent Application No. 201910971041.8, entitled "A Spatial Autocorrelation Machine Learning-based Downscaling Method and System of Satellite Precipitation Data" filed on Oct. 14, 2019.

TECHNICAL FIELD

The invention relates to a downscaling method for satellite remote sensing precipitation data and, in particular, to a machine learning satellite precipitation data downscaling method, system and terminal considering spatial autocorrelation.

BACKGROUND

Precipitation is a key parameter reflecting land surface environmental conditions and global water cycle, which is an important component of water cycle and energy exchange in the climate system, and an important indicator representing climate change. Extreme weather and climate events of precipitation (flood and drought) have an important impact on human production and living. High spatial and temporal resolution and high precision precipitation data are of great significance for hydrological simulation, urban flood disaster monitoring and water resource management. With its wide spatial coverage and high spatial resolution, satellite precipitation data has gradually been an important data source in hydrological research. However, due to the low original resolution of satellite remote sensing (the spatial resolution is generally 0.25°, about 25 km (15.534 miles)), it is difficult to reflect the spatial details of a regional precipitation. In addition, due to the limitations of the physical principle and algorithm of satellite retrieval precipitation, there are certain limitations and deviations in terms of regional scale precipitation, so it is necessary to carry out a spatial downscaling for satellite remote sensing precipitation data, so as to obtain high-precision and high-resolution precipitation data (about 1 km (0.621 miles)).

Some progress has been made in the research on spatial downscaling methods of satellite remote sensing precipitation data. The general research ideas mainly focus on establishing a regression model of precipitation and land surface parameters with low resolution scale, and then using the regression model and a high-resolution land surface parameters to estimate a high-resolution precipitation data.

However, there are still two shortages. On the one hand, the established regression model between precipitation and land surface parameters does not consider the spatial autocorrelation information of precipitation, which will cause a loss of spatial information of precipitation data and bring uncertainty to the model establishment. On the other hand, only traditional point interpolation methods like spline interpolation or others are used for residuals correction, without considering the difference of area element scale before and after downscaling and the intrinsic spatial relativity of data, which will bring certain precision loss to downscaling results.

After searching, it is found that:

1. Chinese Patent Publication No. CN107608939A, published on Jan. 19, 2018, entitled "Method for Downscaling TRMM Precipitation Data based on High Resolution Satellite Data", discloses a method for downscaling TRMM precipitation data based on high resolution satellite data. The method first obtains a variety of meteorological satellite data from official ways, and corrects TRMM remote sensing precipitation data based on a Leave one out cross-validation method. Then, according to the factors affecting precipitation data, variables are selected by a step regression, and the lag between precipitation and vegetation, as well as the spatial correlation of vegetation, are considered to establish a multi-spatial scale model, and the optimal model is selected to downscale the precipitation data. The method is simple and accurate for precipitation prediction. However, this method still has the following problems:

(1) This method only establishes the regression model between precipitation data and independent variables, and it does not consider the nonlinear relationship between precipitation data and independent variables, nor does it consider the spatial autocorrelation information of satellite remote sensing precipitation data itself, and it ignores the intrinsic spatial autocorrelation characteristics of precipitation data in the geographical process;

(2) This method only adopts the traditional interpolation method to correct the precipitation residual, and it does not consider the difference of the surface element scale before and after the downscaling and the intrinsic spatial correlation of the data, which will bring certain precision loss to the result of the downscaling.

2. Chinese Patent Publication No. CN109375294A, published on Feb. 22, 2019, entitled "A Mountain Area Precipitation Data Downscale Correction Method", discloses a method for the downscaling correction of satellite precipitation data in mountain areas. The method includes reading a TRMM3B42.V7 satellite precipitation data and carrying out precipitation statistics monthly; correcting the variables fusion and unifying the spatial scale; establishing a regression downscaling model; performing a cross validation and a downscaling. The present invention integrates the precipitation data observed by mountain meteorological stations into the downscaling correction process of satellite precipitation data, optimizes the method by cross-validation technology, gives full play to the advantages of limited observation data in mountainous areas, and greatly improves the accuracy of precipitation after downscaling correction and its consistency with the measured data series. In addition, the downscale technique of multi-method comparison and review has preliminarily solved the problem of system deviation of single downscale correction method, enriched the system of satellite precipitation data downscale correction method, and improved the reliability of the results. The method has good applicability in the downscaling correction of satellite precipitation products in typical mountainous areas, and the related results can provide strong support for the system to acquire the spatial and temporal distribution characteristics of precipitation in mountainous areas. However, this method still has the following problems:

(1) This method only establishes the regression downscaling model between monthly precipitation data and independent variables, ignores the spatial autocorrelation information of satellite remote sensing precipitation data itself, and ignores the intrinsic spatial autocorrelation characteristics of precipitation data in the geographical process;

(2) This method does not correct the residual error of regression downscaling model, which will bring a certain precision loss to the downscaling results. In particular, when the fitting degree of precipitation data and regression model of independent variables is low, the residual error of regression model is relatively large, and the residual error of regression model is larger.

(3) This method only considers the influence of NDVI and topographic factors, and ignores the influence of day/night land surface temperature and day-and-night land surface temperature difference.

3. Chinese Patent Publication No. CN109472393A, published on Mar. 15, 2019, entitled "Method, device and electronic equipment for spatial downscaling precipitation data detection", discloses a spatial downscaling precipitation data detection method, in particular to a method for establishing and training an optimal random forest algorithm model according to a day land surface temperature, a night land surface temperature, a day-and-night land surface temperature difference, a digital elevation model and a vegetation index of a the sample area with a second resolution, as well as a satellite remote sensing precipitation data described of the sample area; inputting a day land surface temperature, a night land surface temperature, a land surface temperature difference between day and night, a digital elevation model and a vegetation index of an area to be detected with a first resolution into the optimal random forest algorithm model to obtain a precipitation data with a the first resolution of the area to be detected; performing a residual correction on the precipitation data with the first resolution to obtain a spatial downscaled precipitation data in the area to be detected. The spatial downscaled precipitation data detection method can obtain precipitation data with high resolution. However, this method still has the following problems:

(1) The method only considering the relevance of a day land surface temperature, a night land surface temperature, a day-and-night land surface temperature difference, a digital elevation model and a vegetation index, regardless of the spatial autocorrelation of satellite remote sensing precipitation data information, ignoring the intrinsic spatial autocorrelation characteristic of precipitation data in the process of geographic;

(2) This method only uses the traditional spline interpolation method to correct the regression residual, and does not consider the difference of the area element scale before and after the downscaling process and the intrinsic spatial correlation of the data, which will bring certain precision loss to the downscaling results;

(3) The initial performance of the random forest model used in this method is poor, especially when there is only one base learner. As the number of learners increases, the random forest usually converges to a lower generalization error and will over fit in the classification or regression problems with high noise.

In conclusion, the existing technologies still have not solved the above two shortages, and neither description nor report of technologies similar to the invention has been found at present, as well as similar materials in the domestic and overseas.

CONTENTS OF THE INVENTION

The invention aiming at the shortages existing in the prior art, provides a method, a system and a terminal for the satellite precipitation data downscaling by means of spatial autocorrelation machine learning. The method, system and terminal include: firstly performing a spatial autocorrelation analysis of a TRMM (Tropical Rainfall Measuring Mission Satellite) monthly precipitation data of 25 km (15.534 miles) to calculate spatial autocorrelation values and obtain spatial autocorrelation values of the precipitation data of 1 km (0.621 miles) by using an area-to-point Kriging interpolation method to interpolate; performing an aggregation on 5 parameters of the NDVI (normalized difference vegetation index), the DEM (digital elevation model), the day land surface temperature, the night land surface temperature, and the day-and-night land surface temperature difference from 1 km (0.621 miles) to 25 km (15.534 miles); and establishing a LightGBM nonlinear regression machine learning model of the TRMM satellite remote sensing precipitation with a low spatial resolution (25 km, 15.534 miles) by using the data significantly related to the TRMM precipitation data including the NDVI, the DEM, the day land surface temperature, the night land surface temperature, the day-and-night land surface temperature difference, and the estimated spatial autocorrelation values of precipitation data; by using the NDVI, the DEM, the day land surface temperature, the night land surface temperature, the day-and-night land surface temperature difference with high spatial resolution (1 km, 0.621 miles) as the input of said model, estimating the satellite remote sensing precipitation with a high spatial resolution; downscaling the residual data of the regression model via the area-to-point Kriging interpolation method; and realizing the error correction of the estimated remote sensing precipitation of TRMM satellite with a high spatial resolution so as to obtain a high precision TRMM spatial downscaled precipitation data. The invention provides a spatial autocorrelation machine learning-based downscaling method of satellite precipitation data, system and terminal, and the downscaling result of the LightGBM downscaling model based on the spatial autocorrelation information is obviously superior to that based on conventional regression model.

The invention is implemented by the following technical solutions:

In one aspect of the invention, a spatial autocorrelation machine learning-based downscaling method of satellite precipitation data is provided, which includes:

S1, obtaining TRMM precipitation data and land surface parameters;

S2, preprocessing the land surface parameters obtained in S1, to obtain DEM, day land surface temperature, night land surface temperature, day-and-night land surface temperature difference and NDVI with spatial resolutions of 1 km (0.621 miles) and 25 km (15.534 miles) respectively;

S3, performing a spatial autocorrelation analysis on the TRMM precipitation data obtained in S1 to obtain an estimated spatial autocorrelation value of precipitation data with a spatial resolution of 25 km (15.534 miles);

S4, downscaling the spatial resolution of the estimated spatial autocorrelation value of the precipitation data in S3 from 25 km (15.534 miles) to 1 km (0.621 miles) via an area-to-point Kriging interpolation method;

S5, based on the NDVI, the DEM, the day land surface temperature, the night land surface temperature, the day-and-night land surface temperature difference with a spatial resolution of 25 km (15.534 miles) obtained in S2, and the spatial autocorrelation values of the precipitation data with a spatial resolution of 25 km (15.534 miles) obtained in S3, establishing a nonlinear regression model of the precipitation data with a spatial resolution of 25 km (15.534 miles), the NDVI, the DEM, the day land surface temperature, the night land surface temperature, the day-and-night land surface temperature difference, and the estimated spatial autocorrelation value of precipitation data, and acquiring a precipitation regression residual with a spatial resolution of 25 km (15.534 miles);

S6, based on the nonlinear regression model established in S5, inputting the NDVI, the DEM, the day land surface temperature, the night land surface temperature, the day-and-night land surface temperature difference with the spatial resolution of 1 km (0.621 miles) obtained in S2 and the spatial autocorrelation value of the precipitation data with a spatial resolution of 1 km (0.621 miles) obtained in S4, and estimating a precipitation downscaling data with a spatial resolution of 1 km (0.621 miles); meanwhile, downscaling the spatial resolution of the precipitation regression residual obtained in S5 from 25 km (15.534 miles) to 1 km (0.621 miles) via an area-to-point Kriging interpolation method, so as to realize the error correction of the estimated precipitation downscaling data with a spatial resolution of 1 km (0.621 miles) and obtain a precipitation downscaling data with a spatial resolution of 1 km (0.621 miles).

Preferably, in S1, the TRMM precipitation data and the land surface parameters include:

TRMM satellite remote sensing monthly precipitation data in a study area;

NDVI and LST of MODIS and DEM;

Daily in-situ precipitation data in a study area.

Preferably, in S2, the preprocessing of data obtained in S1, includes:

S21, performing a projection transformation of the TRMM satellite remote sensing monthly precipitation data and the NDVI and LST of MODIS and DEM, and uniformly projecting the data into a WGS-84 geocentric coordinate system;

S22, on the basis of S21, performing an aggregation average process of DEM to obtain DEM with spatial resolutions of 1 km (0.621 miles) and 25 km (15.534 miles), respectively;

S23, on the basis of S21, extracting the day land surface temperature and night land surface temperature with a spatial resolution of 1 km (0.621 miles) from MOD11A2 data product, respectively; obtaining the day land surface temperature and the night land surface temperature with a spatial resolution of 25 km (15.534 miles) by the aggregation average processing, and calculating the day-and-night land surface temperature difference;

S24, on the basis of S21, extracting the NDVI from the MOD13A2 data product, and after the abnormal value removal processing, obtaining the NDVI with spatial resolutions of 1 km (0.621 miles) and 25 km (15.534 miles) respectively through the aggregation average processing.

Preferably, in S24, the abnormal value removal processing method is as follows: removing these pixels with NDVI<0.

Preferably, in S3, the spatial autocorrelation analysis on the TRMM precipitation data includes the following steps:

S31, extracting the central coordinates of each grid in the TRMM precipitation data with a spatial resolution of 25 km (15.534 miles), calculating the spatial distance between grid i and grid j, setting the reciprocal of the calculated spatial distance as the spatial weight, and obtaining the spatial weight matrix oi between grid i and grid j;

S32, combined with the following formula, calculating the corresponding spatial autocorrelation value $I_i$ of each grid:

$$I_i = \frac{(x_i - \bar{x})\sum_{j=1}^{n}\omega_{ij}(x_i - \bar{x})}{\frac{1}{n}\sum_{j=1}^{n}(x_i - \bar{x})^2}$$

wherein, $x_i$ and $x_j$ are precipitation data of grid i and grid j, respectively; x is the mean value of all precipitation data in grid i and grid j; n is the number of grids; $\omega_{ij}$ is the spatial weight matrix between each grid i and grid j in the study area;

S33, analyzing the spatial aggregation and distribution of the satellite remote sensing precipitation data with a spatial resolution of 25 km (15.534 miles) by using the spatial autocorrelation value $I_i$ corresponding to each calculated grid, and obtaining the estimated spatial autocorrelation value of precipitation data with a spatial resolution of 25 km (15.534 miles).

Preferably, in S4, downscaling the spatial resolution of the spatial autocorrelation value of the precipitation data from 25 km (15.534 miles) to 1 km (0.621 miles) via an area-to-point Kriging interpolation method, includes the following steps:

S41, discretizing the image of the spatial autocorrelation value of precipitation data with a spatial resolution of 25 km (15.534 miles) into 25 km (15.534 miles)×25 km (15.534 miles) polygons, as area data, and calculating the distance between two areas according to the coordinates of the center points of the area data;

S42, discretizing each 25 km (15.534 miles)×25 km (15.534 miles) area data into 25×25 spatial point data; and calculating the distance between each point data and area data;

S43, calculating a priori variogram areaVgm_a=list (model, sill, nugget, range) of the original area scale according to the spatial autocorrelation area data of the precipitation data of 25 km (15.534 miles), with model representing the variogram model, especially a Gau model, sill representing the value of still, nugget representing the value of nugget, and range representing the value of range;

S44, initializing the variogram of the discretized spatial autocorrelation point data of the precipitation data to obtain a point-scale variogram pointVgm_a=list(model, sill, nugget, range), which will be converted into area-scale variogram pointToareaVgm_a=list(model, sill, nugget, range) by regularization;

S45, comparing the difference between the area-scale variogram pointToareaVgm_a and the original area-scale priori variogram areaVgm_a, wherein if the difference is less than 0.001, then the point-scale variogram pointVgm_a, as the estimated optimal point-scale variogram pointVgm, meets the requirements and can be used to execute S47, otherwise, S46 will be further executed;

S46, updating the weight of the point-scale variogram pointVgm_a, re-fitting a new point-scale variogram pointVgm_b and obtaining a new area-scale variogram pointToareaVgm_b by regularization, and continuing to compare with the original area-scale priori variogram areaVgm_a and repeating iteration, until the difference becoming less than 0.001 or the iteration times reaching 500, then the point-scale variogram, as the estimated optimal point-scale variogram pointVgm meets the requirements and can be used to execute S47;

S47, combining with the estimated optimal point-scale variogram pointVgm, calculating the variograms of the area-area $\overline{C}(v_i,v_j)$, and the area-point $\overline{C}(v_i,x)$ by formulas:

$$\overline{C}(v_i, x) = \frac{1}{N(v_i)} \sum_{j=1}^{N(v_i)} C(s_j, x), s_j \in v_i$$

$$\overline{C}(v_i, v_j) = \frac{1}{N(v_i)} \frac{1}{N(v_j)} \sum_{k=1}^{N(v_i)} \sum_{l=1}^{N(v_j)} C(s_k, s_l), s_k \in v_i, s_l \in v_j$$

wherein, $N(v_i)$ and $N(v_j)$ are the 625 points obtained by the discretization of the area $v_i$ and the area $v_j$ respectively, with s representing the discrete points of area, and k and l representing the sequence numbers of the discrete points respectively, and x is the spatial autocorrelation grid point to be interpolated of the TRMM precipitation data with a spatial resolution of 1 km (0.621 miles); $C(s_j,x)$ and $C(s_k, s_l)$ are the point-scale variograms respectively;

S48, combining with the estimated area-area and area-point variograms, establishing the equations, and estimating the weight values by the least square method:

$$\begin{cases} \sum_{j=1}^{K} \lambda_x(v_j)\overline{C}(v_i, v_j) + \mu_x = \overline{C}(v_i, x), i = 1, 2, \ldots, K \\ \sum_{j=1}^{K} \lambda_x(v_j) = 1 \end{cases}$$

wherein, K represents the grid number of the spatial autocorrelation of the original precipitation data with the low spatial resolution of 25 km (15.534 miles), λx represents the weight of the spatial autocorrelation of the original precipitation data with the low spatial resolution of 25 km (15.534 miles) corresponding to the point x to be interpolated, and X represents the Lagrangian operator;

S49, finally, combining with the spatial autocorrelation value of the precipitation data with a spatial resolution of 25 km (15.534 miles) and the corresponding weight, downscaling the spatial autocorrelation value of the precipitation data of 25 km (15.534 miles), and obtaining the spatial autocorrelation value of the precipitation data with a spatial resolution of 1 km (0.621 miles).

Preferably, in S5, a LightGBM machine learning algorithm is used to establish the nonlinear regression model.

Preferably, in S6, downscaling the spatial resolution of the precipitation regression residual from 25 km (15.534 miles) to 1 km (0.621 miles) via the area-to-point Kriging interpolation method, including the following steps:

S61, discretizing the image of the precipitation regression residual with a spatial resolution of 25 km (15.534 miles) into 25 km (15.534 miles)×25 km (15.534 miles) polygons, as area data, and calculating the distance between two areas according to the coordinates of the center points of the area data;

S62, discretizing each 25 km (15.534 miles)×25 km (15.534 miles) area data into 25×25 spatial point data; and calculating the distance between each point data and area data;

S63, calculating a priori variogram areaVgm_a'=list (model, sill, nugget, range) of the original area scale according to the area data of the precipitation regression residual of 25 km (15.534 miles), with model representing the variogram model, especially a Gau model, sill representing the value of still, nugget representing the value of nugget, range representing the value of range;

S64, initializing the variogram of the discretized point data of the precipitation regression residual to obtain the point-scale variogram pointVgm_a'=list(model, sill, nugget, range), which will be converted into the area-scale variogram pointToareaVgm_a'=list(model, sill, nugget, range) by regularization;

S65, comparing the difference between the area-scale variogram pointToareaVgm_a' and the original area-scale priori variogram areaVgm_a', wherein if the difference is less than 0.001, then the point-scale variogram pointVgm_a', as the estimated optimal point-scale variogram pointVgm', meets the requirements and can be used to execute S67, otherwise, S66 will be further executed;

S66, updating the weight of the point-scale variogram pointVgm_a', re-fitting a new point-scale variogram pointVgm_b' and obtaining a new area-scale variogram pointToareaVgm_b' by regularization, and continuing to compare with the prior areaVgm_a' of the original area-scale, and repeating iteration, until the difference becoming less than 0.001 or the iteration times reaching 500, then the point-scale variogram, as the estimated optimal point-scale variogram pointVgm' meets the requirements and can be used to execute S67;

S67, combining with the estimated optimal point-scale variogram pointVgm', calculating the variograms of the area-area $\overline{C}'(v_i,v_j)$, and the area-point $\overline{C}(v_i,x')$ by formulas:

$$\overline{C}'(v_i, x') = \frac{1}{N(v_i)} \sum_{j=1}^{N(v_i)} C'(s_j, x'), s_j \in v_i$$

$$\overline{C}'(v_i, v_j) = \frac{1}{N(v_i)} \frac{1}{N(v_j)} \sum_{k=1}^{N(v_i)} \sum_{l=1}^{N(v_j)} C'(s_k, s_l), s_k \in v_i, s_l \in v_j$$

wherein, $N(v_i)$ and $N(v_j)$ are the 625 points obtained by the discretization of the area $v_i$ and the area $v_j$ respectively, with s representing the discrete points of area, and k and l representing the sequence numbers of the discrete points respectively, and x' is the grid point to be interpolated of the precipitation regression residual with a spatial resolution of 1 km (0.621 miles); $C'(s_j,x')$ and $C'(s_k, s_l)$ are the point-scale variograms respectively;

S68, combining with the estimated area-area and area-point variograms, establishing the equations, and estimating the weight values by the least square method:

$$\begin{cases} \sum_{j=1}^{K'} \lambda_{x'}(v_j)\overline{C}'(v_i, v_j) + \mu_{x'} = \overline{C}'(v_i, x'), i = 1, 2, \ldots, K' \\ \sum_{j=1}^{K'} \lambda_{x'}(v_j) = 1 \end{cases}$$

wherein, K' represents the grid number of the precipitation regression residual with the original low spatial resolution of 25 km (15.534 miles), $\lambda_{x'}$ represents the weight of spatial autocorrelation of the original low spatial resolution 25 km (15.534 miles) precipitation data corresponding to the point x' to be interpolated, and $\mu_{x'}$ represents the Lagrangian operator;

S69, finally, combining with the spatial autocorrelation value of the precipitation data with a spatial resolution of 25 km (15.534 miles) and the corresponding weight, downscaling the precipitation regression residual of 25 km (15.534 miles) and obtaining the precipitation regression residual with a spatial resolution of 1 km (0.621 miles).

According to another aspect of the present invention, a spatial autocorrelation machine learning-based downscaling system of satellite precipitation data is provided, which includes: a data obtaining module, which is used to obtain TRMM precipitation data and land surface parameters;

a data preprocessing module, which is used to preprocess the land surface parameters obtained by the data obtaining module, to obtain DEM, day land surface temperature, night land surface temperature, day-and-night surface temperature difference and NDVI with spatial resolutions of 1 km (0.621 miles) and 25 km (15.534 miles), respectively;

a precipitation spatial autocorrelation analysis module, which is used for a spatial autocorrelation analysis on the TRMM precipitation data obtained by the data obtaining module to obtain an estimated spatial autocorrelation value of the precipitation data with a spatial resolution of 25 km (15.534 miles);

a downscaling module for the spatial autocorrelation value of precipitation data, which is used to downscale the spatial resolution of the estimated spatial autocorrelation value of precipitation data obtained by the precipitation spatial autocorrelation analysis module from 25 km (15.534 miles) to 1 km (0.621 miles);

a LightGBM regression modeling module, which is used to establish a non-linear regression model of the precipitation data with a spatial resolution of 25 km (15.534 miles), the NDVI, the DEM, the day land surface temperature, the night land surface temperature, the day-and-night land surface temperature difference and the estimated spatial autocorrelation values of the precipitation data, according to the NDVI, the DEM, the day land surface temperature, the night land surface temperature, the day-and-night land surface temperature difference with a spatial resolution of 25 km (15.534 miles) obtained in the data preprocessing module and the spatial autocorrelation value of the precipitation data with a spatial resolution of 25 km (15.534 miles) obtained in the precipitation spatial autocorrelation analysis module, so as to obtain a precipitation regression residual with a spatial resolution of 25 km (15.534 miles);

a downscaling predicting module, which is used to estimate a precipitation downscaling data with a spatial resolution of 1 km (0.621 miles) by using the NDVI, the DEM, the day land surface temperature, the night land surface temperature, the day-and-night land surface temperature difference with a spatial resolution of 1 km (0.621 miles) obtained in the data preprocessing module, and the spatial autocorrelation value of precipitation data with a spatial resolution of 1 km (0.621 miles) obtained in the downscaling module for the spatial autocorrelation value of precipitation data as the input of the nonlinear regression model established by the LightGBM regression modeling module, meanwhile, downscale the spatial resolution of the precipitation regression residual obtained from the LightGBM regression modeling module from 25 km (15.534 miles) to 1 km (0.621 miles), so as to realize the error correction of the estimated precipitation downscaling data with a spatial resolution of 1 km (0.621 miles) and obtain the precipitation downscaling data with a spatial resolution of 1 km (0.621 miles).

In accordance with the third aspect of the invention, a terminal is provided, comprising a memory, a processor and a computer program stored in memory and capable of running on a processor, when the processor executes the computer program, any of the methods described above can be executed.

Compared with the prior art, the present invention has the following beneficial effects:

The spatial autocorrelation machine learning-based downscaling method of satellite precipitation data, system and terminal provided by this invention, can execute a spatial downscaling on the TRMM precipitation data by combining a geo-statistics spatial autocorrelation analysis, the theory of area-to point Kriging interpolation and the theory of LightGBM nonlinear regression modeling, with considering the spatial autocorrelation information of the precipitation data itself, the difference of area elements before and after the downscaling process, and the intrinsic spatial autocorrelation of the data.

The spatial autocorrelation machine learning-based downscaling method of satellite precipitation data, system and terminal can find the spatial autocorrelation characteristic of the precipitation data well via the geo-statistics of spatial autocorrelation analysis, and can carry out a more accurate precipitation prediction of a complex area by a LightGBM regression model with multiple land surface parameters, and can realize the error correction of the predicted TRMM satellite remote sensing precipitation data with a high resolution via the area-to-point Kriging interpolation method, greatly improving the spatial resolution and accuracy of the TRMM satellite remote sensing precipitation data.

It has great theoretical and practical significance, and popularization value.

DESCRIPTION OF FIGURES

Some more features, purposes, and advantages of the invention will become more apparent by reading a detailed description of the following figures as non-restrictive embodiments of the invention.

EMBODIMENTS

The embodiments of the invention are described in detail as following. The embodiments of the invention are implemented on the premise of the technical scheme of the invention, and the detailed embodiments and the specific operation process are given. It should be pointed out that a person skilled in the art can make several deformations and improvements without breaking away from the idea of the present invention, which belong to the protection scope of the present invention.

The embodiment of the present invention provides a machine learning downscaling method for satellite remote sensing precipitation data considering spatial autocorrelation. The method firstly performs a spatial autocorrelation analysis of a TRMM monthly precipitation data of 25 km (15.534 miles) to calculate a spatial autocorrelation values and obtain a spatial autocorrelation values of the precipitation data of 1 km (0.621 miles) by using an area to point Kriging interpolation method to interpolate; performs an aggregation on 5 parameters of NDVI, the DEM, the day land surface temperature, the night land surface temperature, and the day-and-night land surface temperature difference from 1 km (0.621 miles) to 25 km (15.534 miles); and establishes a LightGBM nonlinear regression machine learning model of the TRMM satellite remote sensing precipitation with a low spatial resolution (25 km, 15.534 miles) by using the data significantly related to the TRMM precipitation data including the NDVI, the DEM, the day land surface temperature, the night land surface temperature, the day-and-night land surface temperature difference, and the estimated spatial autocorrelation values of precipitation data; by using the NDVI, the DEM, the day land surface temperature, the night land surface temperature, the day-and-night land surface temperature difference with high spatial resolution (1 km, 0.621 miles) as the input of said model, estimates the satellite remote sensing precipitation with a high spatial resolution; downscales the residual data of the regression model via the area-to-point Kriging interpolation method; and realizes the error correction of the estimated remote sensing precipitation of TRMM satellite with a high spatial resolution, so as to obtain a high-precision TRMM spatial downscaled precipitation data. The downscaling result of LightGBM downscaling model based on the spatial autocorrelation information is obviously superior to that based on conventional regression model.

Figure 2:
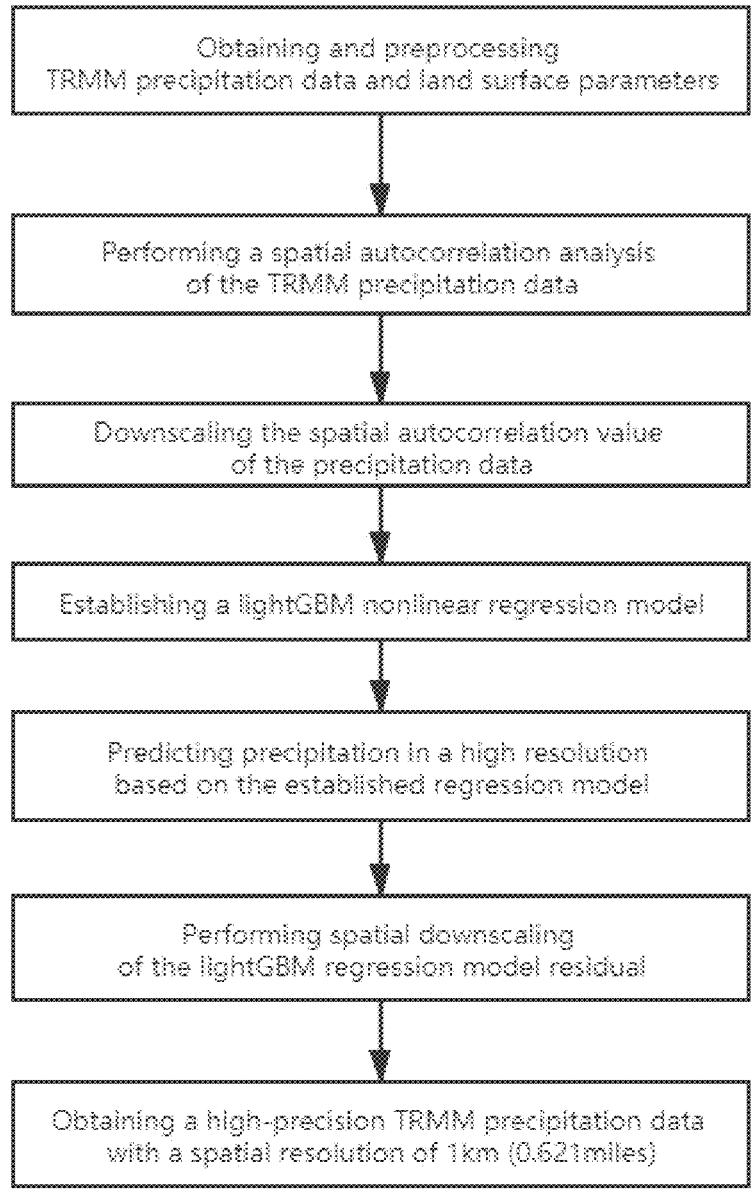
FIG. 2 is a flow chart of a spatial autocorrelation machine learning-based downscaling method of satellite precipitation data provided by an embodiment of the present invention.

In particular,

As shown in FIG. 2, the spatial autocorrelation machine learning-based downscaling method of satellite precipitation data provided in embodiments of the present invention includes:

S1, obtaining TRMM precipitation data and land surface parameters, includes:

obtaining TRMM satellite remote sensing monthly precipitation data in a study area, obtaining NDVI and LST (Satellite Remote Sensing Data Retrieval Land Surface Temperature) of MODIS and DEM, and collecting daily in-situ precipitation data in the study area.

S2, preprocessing the surface parameter data obtained in S1, includes S21: performing a projection transformation of the TRMM satellite remote sensing monthly precipitation data and the NDVI and LST of MODIS and DEM, and uniformly projecting the data into a WGS-84 geocentric coordinate system; on the basis of S21, S22: performing an aggregation average process of DEM to obtain DEM with spatial resolutions of 1 km (0.621 miles) and 25 km (15.534 miles) respectively; S23: extracting the day land surface temperature and night land surface temperature with a spatial resolution of 1 km (0.621 miles) from MOD11A2 data product, respectively; obtaining the day land surface temperature and the night land surface temperature with a spatial resolution of 25 km (15.534 miles) by the aggregation average processing, and calculating the day-and-night land surface temperature difference; S24: extracting the NDVI from the MOD13A2 data product, and after the abnormal value removal processing, obtaining the NDVI with spatial resolutions of 1 km (0.621 miles) and 25 km (15.534 miles) respectively through the aggregation average processing. The abnormal value removal processing method is as follows: removing these pixels with NDVI<0, so as to reduce the influence of water body, snow and ice. S22-S24 is implemented on the basis of S21 to ensure that their coordinate system and projection are consistent and the position deviation in subsequent processing is avoided.

S3, performing a spatial autocorrelation analysis on the TRMM precipitation data to obtain an estimated spatial autocorrelation value of precipitation data with a spatial resolution of 25 km (15.534 miles).

S31, extracting the central coordinates of each grid in the TRMM precipitation data with a spatial resolution of 25 km (15.534 miles), calculating the spatial distance between grid i and grid j, setting the reciprocal of the calculated spatial distance as the spatial weight, and obtaining the spatial weight matrix $\omega_{ij}$ between grid i and grid j;

S32, combined with the following formula, calculating the corresponding spatial autocorrelation value $I_i$ of each grid:

$$I_i = \frac{(x_i - \bar{x}) \sum_{j=1}^{n} \omega_{ij}(x_i - \bar{x})}{\frac{1}{n}\sum_{j=1}^{n}(x_i - \bar{x})^2}$$

wherein, $x_i$ and $x_j$ are precipitation data of grid i and grid j, respectively; x is the mean value of all precipitation data in grid i and grid j; n is the number of grids; $\omega_{ij}$ is the spatial weight matrix between each grid i and grid j in the study area;

S33, analyzing the spatial aggregation and distribution of the satellite remote sensing precipitation data with a spatial resolution of 25 km (15.534 miles) by using the spatial autocorrelation value $I_i$ corresponding to each calculated grid, and obtaining the estimated spatial autocorrelation value of precipitation data with a spatial resolution of 25 km (15.534 miles).

Furthermore, said S31 and S32 can be implemented in the R language.

S4, downscaling the spatial autocorrelation of the precipitation data: downscaling the spatial resolution of the estimated spatial autocorrelation value of the precipitation data in S3 from 25 km (15.534 miles) to 1 km (0.621 miles) via an area-to-point Kriging interpolation method, and obtaining an estimated spatial autocorrelation value of the precipitation data with a spatial resolution of 1 km (0.621 miles), which includes the following steps:

S41, discretizing the image of the spatial autocorrelation value of precipitation data with a spatial resolution of 25 km (15.534 miles) into 25 km (15.534 miles)×25 km (15.534 miles) polygons, as area data, and calculating the distance between two areas according to the coordinates of the center points of the area data;

S42, discretizing each 25 km (15.534 miles)×25 km (15.534 miles) area data into 25×25 spatial point data; and calculating the distance between each point data and area data;

S43, calculating a priori variogram areaVgm_a=list (model, sill, nugget, range) of the original area scale according to the spatial autocorrelation area data of the precipitation data of 25 km (15.534 miles), with model representing the variogram model, especially a Gau model, sill representing the value of still, nugget representing the value of nugget, and range representing the value of range;

S44, initializing the variogram of the discretized spatial autocorrelation point data of the precipitation data to obtain a point-scale variogram pointVgm_a, which will be converted into area-scale variogram pointToareaVgm_a by regularization, wherein, pointVgm_a=list(model, sill, nugget, range),
pointToareaVgm_a=list(model, sill, nugget, range);

S45, comparing the difference between the area-scale variogram pointToareaVgm_a and the original area-scale priori variogram areaVgm_a, wherein if the difference is less than 0.001, then the point-scale variogram pointVgm_a, as the estimated optimal point-scale variogram pointVgm, meets the requirements and can be used to execute S47, otherwise, S46 will be further executed;

S46, updating the weight of the point-scale variogram pointVgm_a, re-fitting a new point-scale variogram pointVgm_b, and obtaining a new area-scale variogram pointToareaVgm_b by regularization, and continuing to compare with the original area-scale priori variogram areaVgm_a, and repeating iteration, until the difference becoming less than 0.001 or the iteration times reaching 500, then the point-scale variogram, as the estimated optimal point-scale variogram pointVgm meets the requirements and can be used to execute S47;

S47, combining with the estimated optimal point-scale variogram pointVgm, calculating the variograms of the area-area $C(v_i, v_j)$, and the area-point $C(v_i, x)$ by the following formulas:

$$\overline{C}(v_i, x) = \frac{1}{N(v_i)} \sum_{j=1}^{N(v_i)} C(s_j, x), s_j \in v_i$$

$$\overline{C}(v_i, v_j) = \frac{1}{N(v_i)} \frac{1}{N(v_j)} \sum_{k=1}^{N(v_i)} \sum_{l=1}^{N(v_j)} C(s_k, s_l), s_k \in v_i, s_l \in v_j$$

wherein, $N(v_i)$ and $N(v_j)$ are the 625 points obtained by the discretization of the area $v_i$ and the area $v_j$ respectively, with s representing the discrete points of area, and k and l representing the sequence numbers of the discrete points respectively, and x is the spatial autocorrelation grid point to be interpolated of the TRMM precipitation data with a spatial resolution of 1 km (0.621 miles); $C(s_j, x)$ and $C(s_k, si)$ are the point-scale variograms respectively;

S48, combining with the estimated area-area and area-pint variograms, establishing the equations, and estimating the weight values by the least square method:

$$\begin{cases} \sum_{j=1}^{K} \lambda_x(v_j) \overline{C}(v_i, v_j) + \mu_x = \overline{C}(v_i, x), i = 1, 2, \ldots, K \\ \sum_{j=1}^{K} \lambda_x(v_j) = 1 \end{cases}$$

wherein, K represents the grid number of the spatial autocorrelation of the original precipitation data with the low spatial resolution of 25 km (15.534 miles), Ax represents the weight of the spatial autocorrelation of the original precipitation data with the low spatial resolution of 25 km (15.534 miles) corresponding to the point x to be interpolated, and represents the Lagrangian operator;

S49, finally, combining with the spatial autocorrelation value of the precipitation data with a spatial resolution of 25 km (15.534 miles) and the corresponding weight, downscaling the spatial autocorrelation value of the precipitation data of 25 km (15.534 miles), and obtaining the spatial autocorrelation value of the precipitation data with a spatial resolution of 1 km (0.621 miles).

Furthermore, S4 can be implemented in the R language.

S5, LightGBM regression modeling: by using the LightGBM machine learning algorithm, establishing a nonlinear regression model of the precipitation data with a spatial resolution of 25 km (15.534 miles), the NDVI, the DEM, the day land surface temperature, the night land surface temperature, the day-and-night land surface temperature difference, and the estimated spatial autocorrelation value of precipitation data, and acquiring a precipitation regression residual with a spatial resolution of 25 km (15.534 miles).

S6, downscale predicting: based on the nonlinear regression model established in S5, inputting the NDVI, the DEM, the day land surface temperature, the night land surface temperature, the day-and-night land surface temperature difference with the spatial resolution of 1 km (0.621 miles) obtained in S2 and the spatial autocorrelation value of the precipitation data with a spatial resolution of 1 km (0.621 miles) obtained in S4, and estimating a precipitation downscaling data with a spatial resolution of 1 km (0.621 miles); meanwhile, downscaling the spatial resolution of the precipitation regression residual obtained in S5 from 25 km (15.534 miles) to 1 km (0.621 miles) via an area-to-point Kriging interpolation method, so as to realize the error correction of the estimated precipitation downscaling data with a spatial resolution of 1 km (0.621 miles) and obtain a precipitation downscaling data with a spatial resolution of 1 km (0.621 miles); which, includes the following steps:

S61, discretizing the image of the precipitation regression residual with a spatial resolution of 25 km (15.534 miles) into 25 km (15.534 miles)×25 km (15.534 miles) polygons, as area data, and calculating the distance between two areas according to the coordinates of the center points of the area data;

S62, discretizing each 25 km (15.534 miles)×25 km (15.534 miles) area data into 25×25 spatial point data; and calculating the distance between each point data and area data;

S63, calculating a priori variogram areaVgm_a'=list (model, sill, nugget, range) of the original area scale according to the spatial autocorrelation area data of the precipitation data of 25 km (15.534 miles), wherein model represents the variogram model, here using a Gau model, sill represents the value of still, nugget represents the value of nugget, range represents the value of range;

S64, initializing the variogram of the discretized point data of the precipitation regression residual to obtain the point-scale variogram pointVgm_a', which will be converted into the area-scale variogram pointToareaVgm_a' by regularization, wherein, pointVgm_a'=list(model, sill, nugget, range)
pointToareaVgm_a'=list(model, sill, nugget, range);

S65, comparing the difference between the area-scale variogram pointToareaVgm_a', which is converted from the point-scale variogram pointVgm_a' by regularization, and the original area-scale priori variogram areaVgm_a', wherein if the difference is less than 0.001, then the point-scale variogram pointVgm_a', as the estimated optimal point-scale variogram pointVgm_a', meets the requirements and can be used to execute S67, otherwise, S66 will be further executed;

S66, updating the weight of the point-scale variogram pointVgm_a', re-fitting a new point-scale variogram pointVgm_b' and obtaining a new area-scale variogram pointToareaVgm_b' by regularization, and continuing to compare with the prior areaVgm_a' of the original area-scale, and repeating iteration, until the difference becoming less than 0.001 or the iteration times reaching 500, then the point-scale variogram, as the estimated optimal point-scale variogram pointVgm' meets the requirements and can be used to execute S67;

S67, combining with the estimated optimal point-scale variogram pointVgm', calculating the variograms of the area-area C'($v_i$,$v_j$), and the area-point C($v_i$,x') by formulas:

$$\overline{C}'(v_i, x') = \frac{1}{N(v_i)} \sum_{j=1}^{N(v_i)} C'(s_j, x'), s_j \in v_i$$

$$\overline{C}'(v_i, v_j) = \frac{1}{N(v_i)} \frac{1}{N(v_j)} \sum_{k=1}^{N(v_i)} \sum_{l=1}^{N(v_j)} C'(s_k, s_l), s_k \in v_i, s_l \in v_j$$

wherein, N($v_i$) and N($v_j$) are the 625 points obtained by the discretization of the area $v_i$ and the area $v_j$ respectively, with s representing the discrete points of area, and k and l representing the sequence numbers of the discrete points respectively, and x' is the grid point to be interpolated of the precipitation regression residual with a spatial resolution of 1 km (0.621 miles); C'($s_j$,x') and C'($s_k$, $s_l$) are the point-scale variograms respectively;

S68, combining with the estimated area-area and area-point variograms, establishing the equations, and estimating the weight values by the least square method:

$$\begin{cases} \sum_{j=1}^{K'} \lambda_{x'}(v_j)\overline{C}'(v_i, v_j) + \mu_{x'} = \overline{C}'(v_i, x'), i = 1, 2, \ldots, K' \\ \sum_{j=1}^{K'} \lambda_{x'}(v_j) = 1 \end{cases}$$

wherein, K' represents the grid number of the precipitation regression residual with the original low spatial resolution of 25 km (15.534 miles), $\lambda_{x'}$ represents the weight of spatial autocorrelation of the original low spatial resolution 25 km (15.534 miles) precipitation data corresponding to the point x' to be interpolated, and $\mu_{x'}$ represents the Lagrangian operator;

S69, finally, combining with the spatial autocorrelation value of the precipitation data with a spatial resolution of 25 km (15.534 miles) and the corresponding weight, downscaling the precipitation regression residual of 25 km (15.534 miles) and obtaining the precipitation regression residual with a spatial resolution of 1 km (0.621 miles).

Furthermore, said S6 can be implemented by using R language.

The spatial autocorrelation machine learning-based downscaling method of satellite precipitation data provided by the embodiment of the present invention fully considers the intrinsic spatial autocorrelation characteristics of the precipitation data by introducing the local spatial autocorrelation information of the precipitation data in the downscaling process; moreover, the spatial autocorrelation information of 25 km (15.534 miles) is downscaled by using the area-to-point Kriging interpolation method to obtain the spatial autocorrelation information of the precipitation data of 1 km (0.621 miles). This method can maintain the spatial distribution pattern of the spatial autocorrelation information of the precipitation data of 25 km (15.534 miles) by considering the intrinsic spatial correlation of the precipitation spatial autocorrelation information. However, the intrinsic spatial autocorrelation of the precipitation data is not considered in other existing downscaling methods.

Figure 1:
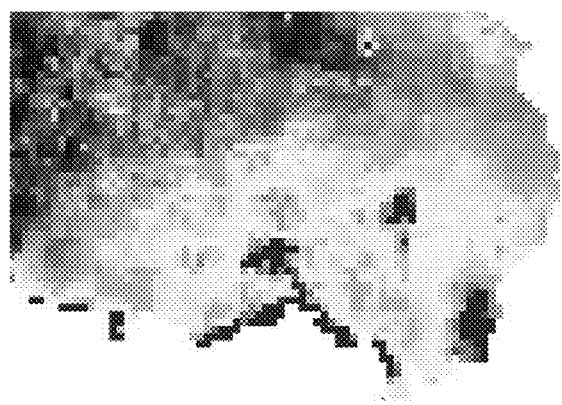
FIG. 1 is a comparison diagram of the spatial autocorrelation machine learning-based downscaling method of satellite precipitation data provided by an embodiment of the present invention; wherein, (a) is the TRMM precipitation data of 25 km (15.534 miles) on June 2003, (b) is a linear regression downscaling result, (c) is the downscaling result based on the random forest algorithm, and (d) is a downscaling result of the method provided by the present invention.
Figure 1:
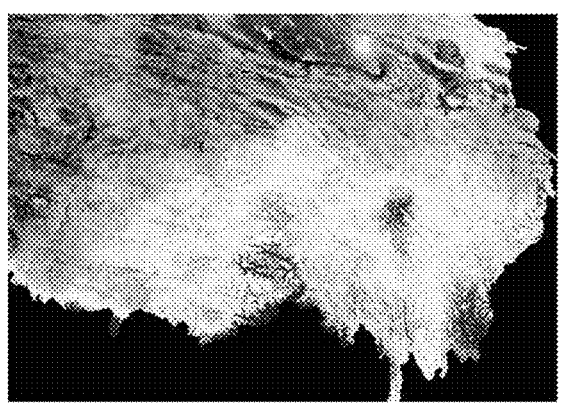
Figure 1:
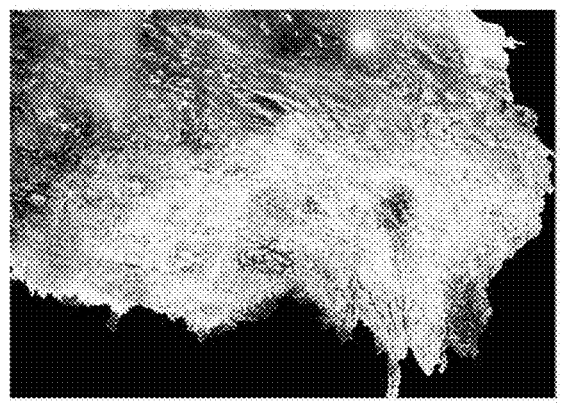
Figure 1:
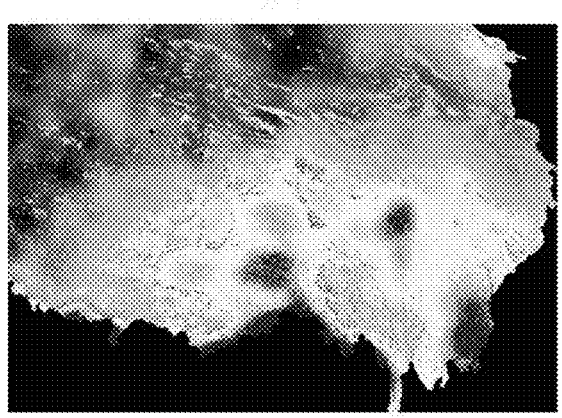

The downscaling methods existed currently are usually in the form of regression downscaling methods based on the significant correlation between the precipitation data and the land surface parameters, so the downscaling results of the methods will be affected by the land surface parameters, which makes the final downscaling result discreted, losing the spatial distribution pattern of the original satellite remote sensing precipitation data, as shown in FIGS. 1 (b) and (c). However, the spatial autocorrelation machine learning-based downscaling method of satellite precipitation data provided by the embodiment of the present invention can well depict the spatial clustering characteristics of the downscaling results and maintain the spatial distribution pattern of the original satellite remote sensing precipitation data, as shown in FIG. 1 (d). Because the method provided in this invention, not only considers the nonlinear relationship and scale effect of the land surface temperature and the land surface parameters, but also introduces a local spatial autocorrelation information of the precipitation data in the process of downscaling, fully considering the intrinsic spatial autocorrelation characteristic of the precipitation data, the spatial distribution of precipitation data itself can better depicted.

Through a large amount of experiments for comparison, especially in the case of insufficient correlation between the precipitation data and the land surface parameters, the method proposed in the embodiment of the present invention can significantly improve the precision of the downscaling results. By calculation, the method provided by the embodiment of the invention can effectively improve the precision of the downscaling model, generally by 10-15%, compared with other downscaling models that do not consider the spatial autocorrelation information of the precipitation data.

According to the spatial autocorrelation machine learning-based downscaling method of satellite precipitation data provided by the above embodiments of the invention, the embodiments of the invention also provide a spatial autocorrelation machine learning-based downscaling system of satellite precipitation data, which can be used to implement the method provided by the above embodiments of the invention.

In particular, the spatial autocorrelation machine learning-based downscaling system of satellite precipitation data includes:

a data obtaining module, which is used to obtain TRMM precipitation data and land surface parameters;

a data preprocessing module, which is used to preprocess the land surface parameters obtained by the data obtaining module, to obtain DEM, day land surface temperature, night land surface temperature, day-and-night surface temperature difference and NDVI with spatial resolutions of 1 km (0.621 miles) and 25 km (15.534 miles), respectively;

a precipitation spatial autocorrelation analysis module, which is used for a spatial autocorrelation analysis on the TRMM precipitation data obtained by the data obtaining module to obtain an estimated spatial autocorrelation value of the precipitation data with a spatial resolution of 25 km (15.534 miles);

a downscaling module for the spatial autocorrelation value of precipitation data, which is used to downscale the spatial resolution of the estimated spatial autocorrelation value of precipitation data obtained by the precipitation spatial autocorrelation analysis module from 25 km (15.534 miles) to 1 km (0.621 miles);

a LightGBM regression modeling module, which is used to establish a non-linear regression model of the precipitation data with a spatial resolution of 25 km (15.534 miles), the NDVI, the DEM, the day land surface temperature, the night land surface temperature, the day-and-night land surface temperature difference and the estimated spatial autocorrelation values of the precipitation data, according to the NDVI, the DEM, the day land surface temperature, the night land surface temperature, the day-and-night land surface temperature difference with a spatial resolution of 25 km (15.534 miles), obtained in the data preprocessing module, and the spatial autocorrelation value of the precipitation data with a spatial resolution of 25 km (15.534 miles) obtained in the precipitation spatial autocorrelation analysis module, so as to obtain a precipitation regression residual with a spatial resolution of 25 km (15.534 miles);

a downscaling predicting module, which is used to estimate a precipitation downscaling data with a spatial resolution of 1 km (0.621 miles) by using the NDVI, the DEM, the day land surface temperature, the night land surface temperature, the day-and-night land surface temperature difference with a spatial resolution of 1 km (0.621 miles) obtained in the data preprocessing module, and the spatial autocorrelation value of precipitation data with a spatial resolution of 1 km (0.621 miles) obtained in the downscaling module for the spatial autocorrelation value of precipitation data as the input of the nonlinear regression model established by the LightGBM regression modeling module, meanwhile, downscale the spatial resolution of the precipitation regression residual obtained from the LightGBM regression modeling module from 25 km (15.534 miles) to 1 km (0.621 miles), so as to realize the error correction of the estimated precipitation downscaling data with a spatial resolution of 1 km (0.621 miles) and obtain the precipitation downscaling data with a spatial resolution of 1 km (0.621 miles).

According to the spatial autocorrelation machine learning-based downscaling method of satellite precipitation data provided by the above embodiment of this invention, the embodiments of the invention simultaneously provide a terminal, including a memory, a processor and the computer program provided in the above embodiments of the invention that are stored on the memory and can be operated through the processor. Further, the computer program can be operated by the processor to perform the method provided in any of the above embodiments of the invention.

According to the spatial autocorrelation machine learning-based downscaling method of satellite precipitation data provided by the above embodiment of this invention, the embodiments of the invention simultaneously provide another terminal, including a memory, a processor and the system provided in the above embodiments of the invention. The system is stored on the memory and can be operated through the processor. Further, the system can be used to perform the method provided in any of the above embodiments of the invention.

The spatial autocorrelation machine learning-based downscaling method of satellite precipitation data, system and terminal provided by the above embodiment of this invention, can execute a spatial downscaling on the TRMM precipitation data through a spatial autocorrelation analysis, a theory of area-to-point Kriging interpolation and a theory of LightGBM nonlinear regression modeling, with considering the spatial autocorrelation information of the precipitation data itself, the difference of area elements before and after the downscaling process, and the intrinsic spatial autocorrelation of the data. The method, system and terminals can find the spatial autocorrelation characteristic of the precipitation data well via the spatial autocorrelation analysis, and can carry out a more accurate precipitation prediction of a complex area by a LightGBM regression model with multiple land surface parameters, and can realize the error correction of the predicted TRMM satellite remote sensing precipitation data with a high resolution via the area-to-point Kriging interpolation method, greatly improving the spatial resolution and accuracy of the TRMM satellite remote sensing precipitation data. It has great theoretical and practical significance, and popularization value.

The specific embodiments of the present invention are described above. It should be understood that the present invention is not limited to the above specific embodiments, and technicians in the art may make various variations or modifications within the scope of claims, which shall not affect the substantive content of the present invention.

The invention claimed is:

1. A spatial autocorrelation machine learning-based downscaling method of satellite precipitation data, wherein:
    Step 1, obtaining TRMM precipitation data and land surface parameters;
    Step 2, preprocessing the land surface parameters obtained in Step 1, to obtain DEM, day land surface temperature, night land surface temperature, day-and-night land surface temperature difference and NDVI with spatial resolutions of 1 km and 25 km, respectively;
    Step 3, performing a spatial autocorrelation analysis on the TRMM precipitation data obtained in Step 1 to obtain an estimated spatial autocorrelation value of precipitation data with a spatial resolution of 25 km;
    Step 4, downscaling the spatial resolution of the estimated spatial autocorrelation value of the precipitation data in Step 3 from 25 km to 1 km via an area-to-point Kriging interpolation method;
    Step 5, based on the NDVI, the DEM, the day land surface temperature, the night land surface temperature, the day-and-night land surface temperature difference with a spatial resolution of 25 km obtained in Step 2, and the spatial autocorrelation values of the precipitation data with a spatial resolution of 25 km obtained in Step 3, establishing a nonlinear regression model of the precipitation data with a spatial resolution of 25 km, the NDVI, the DEM, the day land surface temperature, the night land surface temperature, the day-and-night land surface temperature difference, and the estimated spatial autocorrelation value of precipitation data, and acquiring a precipitation regression residual with a spatial resolution of 25 km;
    Step 6, based on the nonlinear regression model established in Step 5, inputting the NDVI, the DEM, the day land surface temperature, the night land surface temperature, the day-and-night land surface temperature difference with the spatial resolution of 1 km obtained in Step 2 and the spatial autocorrelation value of the precipitation data with a spatial resolution of 1 km obtained in Step 4, and estimating a precipitation downscaling data with a spatial resolution of 1 km; meanwhile, downscaling the spatial resolution of the precipitation regression residual obtained in Step 5 from 25 km to 1 km via an area-to-point Kriging interpolation method, so as to realize the error correction of the estimated precipitation downscaling data with a spatial resolution of 1 km and obtain a precipitation downscaling data with a spatial resolution of 1 km.

2. The spatial autocorrelation machine learning-based downscaling method of satellite precipitation data of claim 1, wherein, in Step 1, the TRMM precipitation data and the land surface parameters include:
   TRMM satellite remote sensing monthly precipitation data in a study area;
   NDVI and LST of MODIS and DEM;
   daily in-situ precipitation data in the study area.

3. The spatial autocorrelation machine learning-based downscaling method of satellite precipitation data of claim 2, wherein, in Step 2, the preprocessing of the data obtained in Step 1 includes:
   Step 2-1, performing a projection transformation of the TRMM satellite remote sensing monthly precipitation data and the NDVI and LST of MODIS and DEM, and uniformly projecting the data into a WGS-84 geocentric coordinate system;
   Step 2-2, on the basis of Step 2-1, performing an aggregation average process of DEM to obtain DEM with spatial resolutions of 1 km and 25 km, respectively;
   Step 2-3, on the basis of Step 2-1, extracting the day land surface temperature and night land surface temperature with a spatial resolution of 1 km from MOD11A2 data product, respectively; obtaining the day land surface temperature and the night land surface temperature with a spatial resolution of 25 km by the aggregation average processing, and calculating the day-and-night land surface temperature difference;
   Step 2-4, on the basis of Step 2-1, extracting the NDVI from the MOD13A2 data product, and after the abnormal value removal processing, obtaining the NDVI with spatial resolutions of 1 km and 25 km respectively through the aggregation average processing.

4. The spatial autocorrelation machine learning-based downscaling method of satellite precipitation data of claim 3, wherein, in Step 2-4, the abnormal value removal processing method is as follows: removing these pixels with NDVI<0.

5. The spatial autocorrelation machine learning-based downscaling method of satellite precipitation data of claim 1, wherein, in Step 3, the spatial autocorrelation analysis on the TRMM precipitation data includes the following steps:
   Step 3-1, extracting the central coordinates of each grid in the TRMM precipitation data with a spatial resolution of 25 km, calculating the spatial distance between grid i and grid j, setting the reciprocal of the calculated spatial distance as the spatial weight, and obtaining the spatial weight matrix $\omega_{ij}$ between grid i and grid j;
   Step 3-2, combined with the following formula, calculating the corresponding spatial autocorrelation value $I_i$ of each grid:

$$I_i = \frac{(x_i - \bar{x})\sum_{j=1}^{n} \omega_{ij}(x_j - \bar{x})}{\frac{1}{n}\sum_{j=1}^{n}(x_j - \bar{x})^2}$$

wherein, $x_i$ and $x_j$ are precipitation data of grid i and grid j, respectively; $\bar{x}$ is the mean value of all precipitation data in grid i and grid j; n is the number of grids; $\omega_{ij}$ is the spatial weight matrix between each grid i and grid j in the study area;

Step 3-3, analyzing the spatial aggregation and distribution of the satellite remote sensing precipitation data with a spatial resolution of 25 km by using the spatial autocorrelation value $I_i$ corresponding to each calculated grid, and obtaining the estimated spatial autocorrelation value of precipitation data with a spatial resolution of 25 km.

6. The spatial autocorrelation machine learning-based downscaling method of satellite precipitation data of claim 1, wherein, in Step 4, downscaling the spatial resolution of the spatial autocorrelation value of the precipitation data from 25 km to 1 km via an area-to-point Kriging interpolation method, includes the following steps:
   Step 4-1, discretizing the image of the spatial autocorrelation value of precipitation data with a spatial resolution of 25 km into 25 km×25 km polygons, as area data, and calculating the distance between two areas according to the coordinates of the center points of the area data;
   Step 4-2, discretizing each 25 km×25 km area data into 25×25 spatial point data; and calculating the distance between each point data and area data;
   Step 4-3, calculating a priori variogram area Vgm_a=list (model, sill, nugget, range) of the original area scale according to the spatial autocorrelation area data of the precipitation data of 25 km, with model representing the variogram model, especially a Gau model, sill representing the value of still, nugget representing the value of nugget, and range representing the value of range;
   Step 4-4, initializing the variogram of the discretized spatial autocorrelation point data of the precipitation data to obtain a point-scale variogram pointVgm_a=list (model, sill, nugget, range), which will be converted into area-scale variogram pointToareaVgm_a=list (model, sill, nugget, range) by regularization;
   Step 4-5, comparing the difference between the area-scale variogram pointToareaVgm_a and the original area-scale priori variogram areaVgm_a, wherein if the difference is less than 0.001, then the point-scale variogram pointVgm_a, as the estimated optimal point-scale variogram pointVgm, meets the requirements and can be used to execute Step 4-7, otherwise, Step 4-6 will be further executed;
   Step 4-6, updating the weight of the point-scale variogram pointVgm_a, re-fitting a new point-scale variogram pointVgm_b, and obtaining a new area-scale variogram pointToareaVgm_b by regularization, and continuing to compare with the original area-scale priori variogram areaVgm_a, and repeating iteration, until the difference becoming less than 0.001 or the iteration times reaching 500, then the point-scale variogram, as the estimated optimal point-scale variogram pointVgm meets the requirements and can be used to execute Step 4-7;
   Step 4-7, combining with the estimated optimal point-scale variogram pointVgm, calculating the variograms of the area-area $C(v_i, v_j)$ and the area-point $C(v_i, x)$ by formulas;

$$\bar{C}(v_i, x) = \frac{1}{N(v_i)} \sum_{j=1}^{N(v_i)} C(s_j, x), s_j \in v_i$$

-continued $$\overline{C}(v_i, v_j) = \frac{1}{N(v_i)} \frac{1}{N(v_j)} \sum_{k=1}^{N(v_i)} \sum_{l=1}^{N(v_j)} C(s_k, s_l), s_k \in v_i, s_l \in v_j$$

wherein, $N(v_i)$ and $N(v_j)$ are the 625 points obtained by the discretization of the area $v_i$ and the area $v_j$, respectively, with s representing the discrete points of area, and k and l representing the sequence numbers of the discrete points respectively, and x is the spatial autocorrelation grid point to be interpolated of the TRMM precipitation data with a spatial resolution of 1 km; $C(s_j,x)$ and $C(s_k,s_l)$ are the point-scale variograms, respectively;

Step 4-8, combining with the estimated area-area and area-point variograms, establishing the equations, and estimating the weight values by the least square method:

$$\begin{cases} \sum_{j=1}^{K} \lambda_x(v_j)\overline{C}(v_i, v_j) + \mu_x = \overline{C}(v_i, x), i = 1, 2, \ldots, K \\ \sum_{j=1}^{K} \lambda_x(v_j) = 1 \end{cases}$$

wherein, K represents the grid number of the spatial autocorrelation of the original precipitation data with the low spatial resolution of 25 km, λx represents the weight of the spatial autocorrelation of the original precipitation data with the low spatial resolution of 25 km corresponding to the point x to be interpolated, and $\mu_x$ represents the Lagrangian operator;

Step 4-9, finally, combining with the spatial autocorrelation value of the precipitation data with a spatial resolution of 25 km and the corresponding weight, downscaling the spatial autocorrelation value of the precipitation data of 25 km, and obtaining the spatial autocorrelation value of the precipitation data with a spatial resolution of 1 km.

7. The spatial autocorrelation machine learning-based downscaling method of satellite precipitation data of claim 1, wherein, in Step 5, a LightGBM machine learning algorithm is used to establish the nonlinear regression model.

8. The spatial autocorrelation machine learning-based downscaling method of satellite precipitation data of claim 1, wherein, in Step 6, downscaling the spatial resolution of the precipitation regression residual from 25 km to 1 km via the area-to-point Kriging interpolation method, including the following steps:

Step 6-1, discretizing the image of the precipitation regression residual with a spatial resolution of 25 km into 25 km×25 km polygons, as area data, and calculating the distance between two areas according to the coordinates of the center points of the area data;

Step 6-2, discretizing each 25 km×25 km area data into 25×25 spatial point data; and calculating the distance between each point data and area data;

Step 6-3, calculating a priori variogram areaVgm_a'=list (model, sill, nugget, range) of the original area scale according to the area data of the precipitation regression residual of 25 km, with model representing the variogram model, especially a Gau model, sill representing the value of still, nugget representing the value of nugget, range representing the value of range;

Step 6-4, initializing the variogram of the discretized point data of the precipitation regression residual to obtain the point-scale variogram pointVgm_a'=list (model, sill, nugget, range), which will be converted into the area-scale variogram pointToareaVgm_a'=list (model, sill, nugget, range) by regularization;

Step 6-5, comparing the difference between the area-scale variogram pointToareaVgm_a' and the original area-scale priori variogram areaVgm_a', wherein if the difference is less than 0.001, then the point-scale variogram pointVgm_a', as the estimated optimal point-scale variogram pointVgm', meets the requirements and can be used to execute Step 6-7, otherwise, Step 6-6 will be further executed;

Step 6-6, updating the weight of the point-scale variogram pointVgm_a', re-fitting a new point-scale variogram pointVgm_b' and obtaining a new area-scale variogram pointToareaVgm_b' by regularization, and continuing to compare with the prior areaVgm_a' of the original area-scale, and repeating iteration, until the difference becoming less than 0.001 or the iteration times reaching 500, then the point-scale variogram, as the estimated optimal point-scale variogram pointVgm' meets the requirements and can be used to execute Step 6-7;

Step 6-7, combining with the estimated optimal point-scale variogram pointVgm', calculating the variograms of the area-area $C'(v_i,v_j)$ and the area-point $C(v_i,x')$ by formulas;

$$\overline{C'}(v_i, x') = \frac{1}{N(v_i)} \sum_{j=1}^{N(v_i)} C'(s_j, x'), s_j \in v_i$$

$$\overline{C'}(v_i, v_j) = \frac{1}{N(v_i)} \frac{1}{N(v_j)} \sum_{k=1}^{N(v_i)} \sum_{l=1}^{N(v_j)} C'(s_k, s_l), s_k \in v_i, s_l \in v_j$$

wherein, $N(v_i)$ and $N(v_j)$ are the 625 points obtained by the discretization of the area $v_i$ and the area $v_j$ respectively, with s representing the discrete points of area, and k and l representing the sequence numbers of the discrete points respectively, and x' is the grid point to be interpolated of the precipitation regression residual with a spatial resolution of 1 km; $C'(s_j,x')$ and $C'(s_k,s_l)$ are the point-scale variograms respectively;

Step 6-8, combining with the estimated area-area and area-point variograms, establishing the equations, and estimating the weight values by the least square method:

$$\begin{cases} \sum_{j=1}^{K'} \lambda_{x'}(v_j)\overline{C'}(v_i, v_j) + \mu_{x'} = \overline{C'}(v_i, x'), i = 1, 2, \ldots, K' \\ \sum_{j=1}^{K'} \lambda_{x'}(v_j) = 1 \end{cases}$$

wherein, K' represents the grid number of the precipitation regression residual with the original low spatial resolution of 25 km, $\lambda_{x'}$ represents the weight of spatial autocorrelation of the original low spatial resolution 25 km precipitation data corresponding to the point x' to be interpolated, and $\mu_{x'}$ represents the Lagrangian operator;

Step 6-9, finally, combining with the spatial autocorrelation value of the precipitation data with a spatial resolution of 25 km and the corresponding weight, downscaling the precipitation regression residual of 25 km and obtaining the precipitation regression residual with a spatial resolution of 1 km.

9. A spatial autocorrelation machine learning-based downscaling system of satellite precipitation data, wherein:
a data obtaining module, which is used to obtain TRMM precipitation data and land surface parameters;
a data preprocessing module, which is used to preprocess the land surface parameters obtained by the data obtaining module to obtain DEM, day land surface temperature, night land surface temperature, day-and-night surface temperature difference and NDVI with spatial resolutions of 1 km and 25 km, respectively;
a precipitation spatial autocorrelation analysis module, which is used for a spatial autocorrelation analysis on the TRMM precipitation data obtained by the data obtaining module to obtain an estimated spatial autocorrelation value of the precipitation data with a spatial resolution of 25 km;
a downscaling module for the spatial autocorrelation value of precipitation data, which is used to downscale the spatial resolution of the estimated spatial autocorrelation value of precipitation data obtained by the precipitation spatial autocorrelation analysis module from 25 km to 1 km;
a LightGBM regression modeling module, which is used to establish a non-linear regression model of the precipitation data with a spatial resolution of 25 km, the NDVI, the DEM, the day land surface temperature, the night land surface temperature, the day-and-night land surface temperature difference and the estimated spatial autocorrelation values of the precipitation data, according to the NDVI, the DEM, the day land surface temperature, the night land surface temperature, the day-and-night land surface temperature difference with a spatial resolution of 25 km obtained in the data preprocessing module and the spatial autocorrelation value of the precipitation data with a spatial resolution of 25 km obtained in the precipitation spatial autocorrelation analysis module, so as to obtain a precipitation regression residual with a spatial resolution of 25 km;
a downscaling predicting module, which is used to estimate a precipitation downscaling data with a spatial resolution of 1 km by using the NDVI, the DEM, the day land surface temperature, the night land surface temperature, the day-and-night land surface temperature difference with a spatial resolution of 1 km obtained in the data preprocessing module, and the spatial autocorrelation value of precipitation data with a spatial resolution of 1 km obtained in the downscaling module for the spatial autocorrelation value of precipitation data as the input of the nonlinear regression model established by the LightGBM regression modeling module, meanwhile, downscale the spatial resolution of the precipitation regression residual obtained from the LightGBM regression modeling module from 25 km to 1 km, so as to realize the error correction of the estimated precipitation downscaling data with a spatial resolution of 1 km and obtain the precipitation downscaling data with a spatial resolution of 1 km.

10. A terminal comprising a memory, a processor, and a computer program stored in memory and capable of running on the processor, wherein the processor executes the computer program for executing the method of claim 1.

* * * * *